J. M. GOLDSMITH.
Bale-Tag.

No. 164,165.  Patented June 8, 1875.

WITNESSES
Mary S. Utley.
Frank J. Mase

INVENTOR
J. Mortimer Goldsmith
Chipman Hosmer & Co
ATTORNEYS

THE GRAPHIC CO. PHOTO-LITH. 39 & 41 PARK PLACE, N.Y.

UNITED STATES PATENT OFFICE.

J. MORTIMER GOLDSMITH, OF BOSTON, MASSACHUSETTS.

IMPROVEMENT IN BALE-TAGS.

Specification forming part of Letters Patent No. 164,165, dated June 8, 1875; application filed March 6, 1875.

*To all whom it may concern:*

Be it known that I, J. MORTIMER GOLDSMITH, of Boston, in the county of Suffolk and State of Massachusetts, have invented a new and valuable Improvement in Bale-Tags; and I do hereby declare that the following is a full, clear, and exact description of the construction and operation of the same, reference being had to the annexed drawings making a part of this specification, and to the letters and figures of reference marked thereon.

Figure 1:
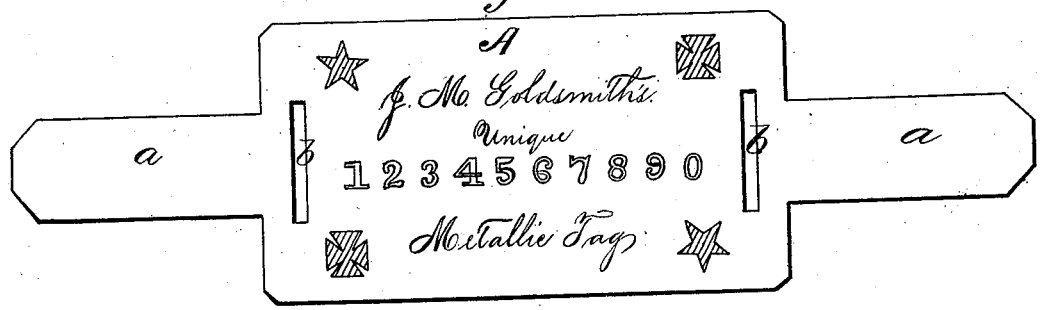
Figure 2:
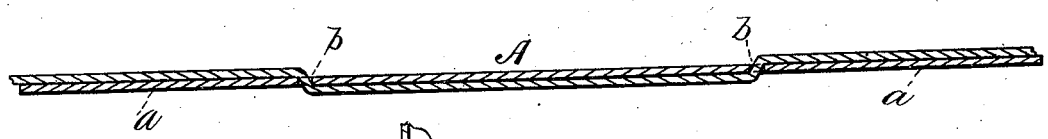
Figure 3:
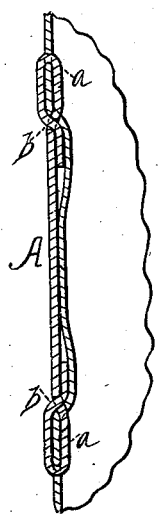

Figure 1 of the drawing is a representation of a plan or face view of my bale-tag. Fig. 2 is a longitudinal sectional view of the same, and Fig. 3 is a sectional view of the same applied to a bale.

This invention has relation to tags for marking cotton. The object of the invention is to do away with the present system of marking the bagging of cotton, or of attaching thereto a paper tag having the name or cipher of the consignee written thereon, both of which are objectionable, the first plan because the marking is liable to be torn off in handling, or to be obliterated and rendered undecipherable by a casual fall in the mud, and the latter because of its extreme fragility. To this end, and for the purpose of remedying the defects above enumerated, the nature of the invention consists in a preferably oblong sheet-metal plate adapted to receive the stamp or cipher of the consignee, the said plate having at each end a tongue of suitable length, and at the heel of each tongue a rectangular slot, to be applied and used in connection with a bale of merchandise, as will be hereinafter more fully explained and claimed.

In the annexed drawings, A designates an oblong sheet-metal plate, having at each end a tongue, *a*, of suitable length, and at the heel of the said tongues a rectangular slot, *b*, adapted to receive the said tongue under circumstances hereinafter explained.

The plate above described is intended to have the name, cipher, symbol, or a combination of them, of the consignor or consignee of the merchandise, or of both, stamped upon it, and is attached to the bale in the following manner, to wit: Tongues *a* are inserted through the meshes of the bagging. Their ends are then bent over and outward, and are inserted into slot *b*, as shown, under the body of the plate, when they are flattened, effectually preventing their casual detachment, and requiring no inconsiderable force to separate the plate from the bale.

In practice, when bales of cotton or merchandise are prepared for foreign shipment by being recompressed, the tag may be attached to the bale as follows: The free end of the metallic binder will be passed downward through one of the slots *b*, thence upward through the other, and the binder secured around the bale in any of the usual ways.

When the bale is removed from compress its expansion will securely lock the tag in place, and, in order to detach it, it will be necessary to break the strap. When the tag is used after this manner I may dispense with tongues *a*, as I may elect.

What I claim as new, and desire to secure by Letters Patent, is—

The bale-tag consisting of the oblong plate A, having slots *b* and tongues *a*, adapted for use substantially as specified.

In testimony that I claim the above I have hereunto subscribed my name in the presence of two witnesses.

J. MORTIMER GOLDSMITH.

Witnesses:
CHAS. ROBINSON, Jr.,
E. H. DARLING.